No. 809,361. PATENTED JAN. 9, 1906.
W. W. DOUGLASS.
WATER ELEVATING AND STORAGE APPARATUS.
APPLICATION FILED JUNE 9, 1904.

7 SHEETS—SHEET 1.

No. 809,361.  
PATENTED JAN. 9, 1906.
W. W. DOUGLASS.  
WATER ELEVATING AND STORAGE APPARATUS.  
APPLICATION FILED JUNE 9, 1904.
7 SHEETS—SHEET 3.
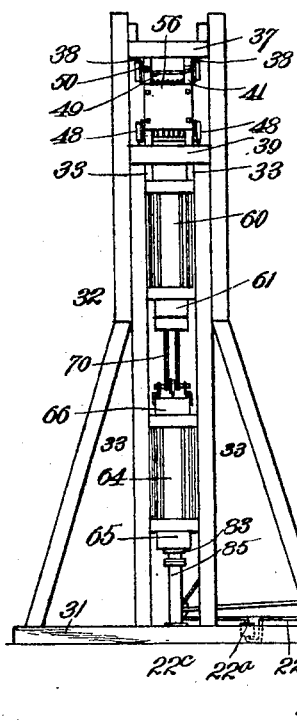
Fig. 3.
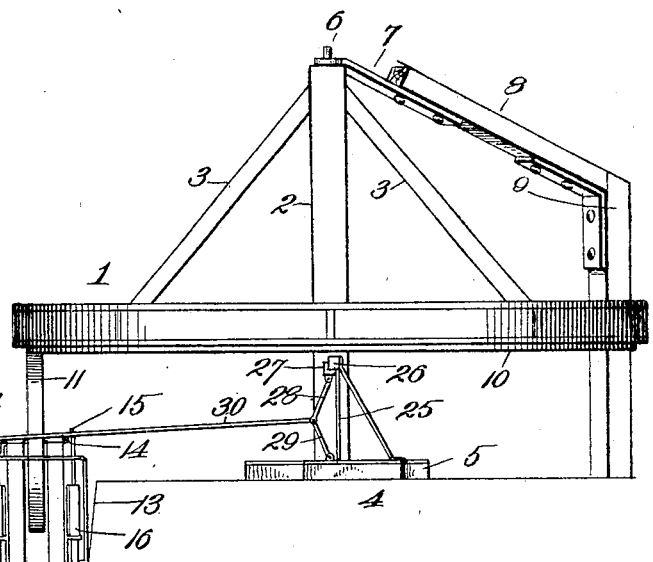
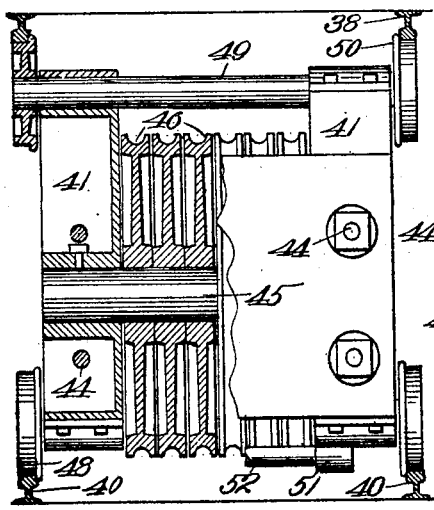
Fig. 13.
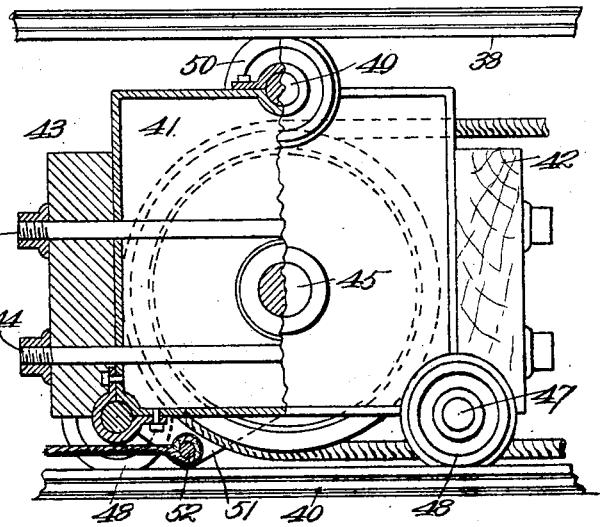
Fig. 14.
Witnesses:  
A. McArthur  
F. R. Glove
Inventor  
W. W. Douglass  
By George A. Thorpe  
atty.

No. 809,361. PATENTED JAN. 9, 1906.
W. W. DOUGLASS.
WATER ELEVATING AND STORAGE APPARATUS.
APPLICATION FILED JUNE 9, 1904.

7 SHEETS—SHEET 4.

Witnesses: Inventor:
W. W. Douglass
atty.

No. 809,361. PATENTED JAN. 9, 1906.
W. W. DOUGLASS.
WATER ELEVATING AND STORAGE APPARATUS.
APPLICATION FILED JUNE 9, 1904.
7 SHEETS—SHEET 5.
Fig. 6.
Fig. 7.
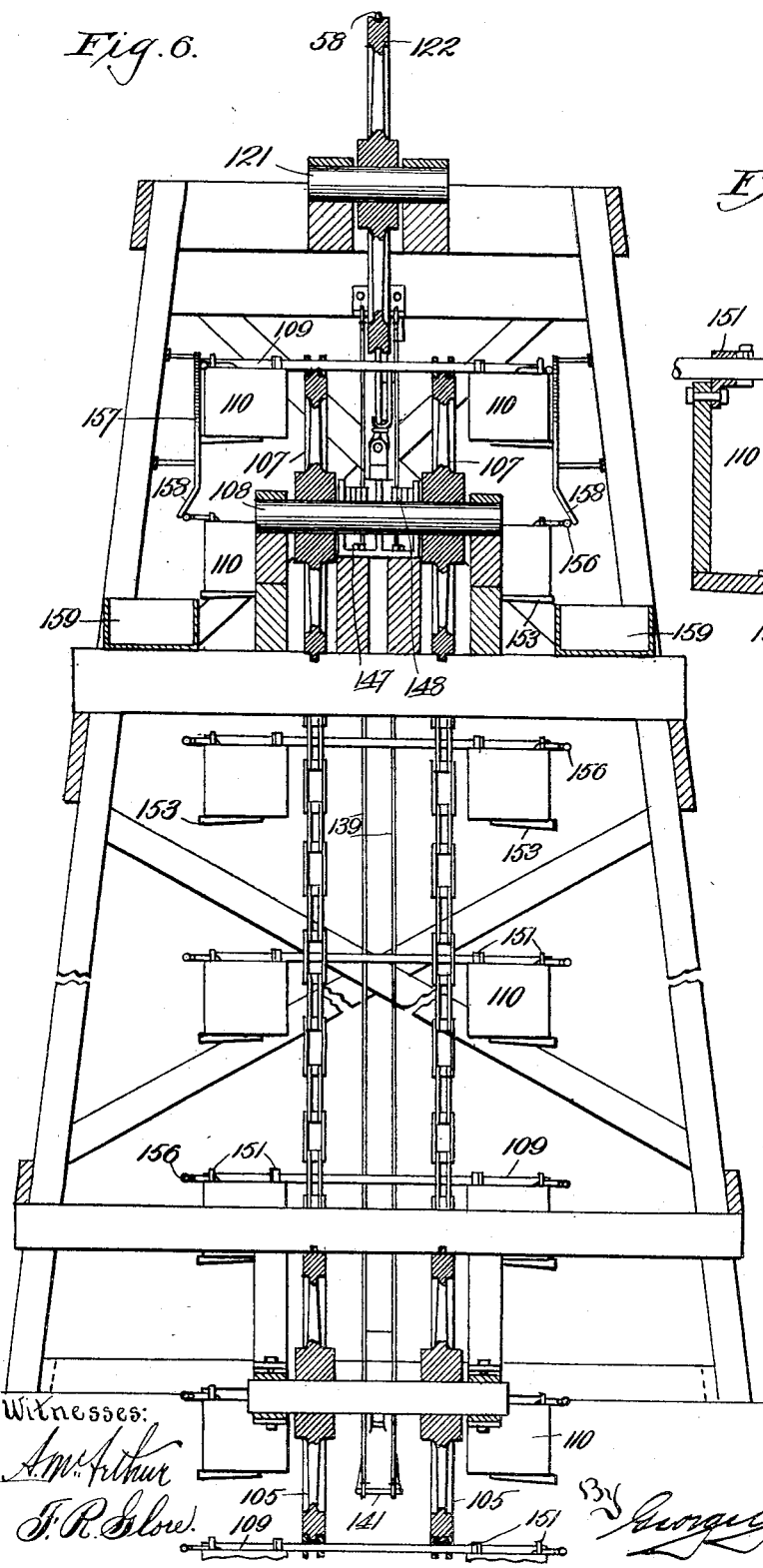
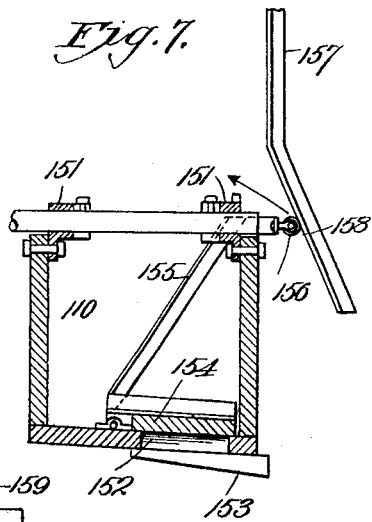
Witnesses:
A. McArthur
F. R. Slow
Inventor:
W. W. Douglass
By George H. Thorpe
Atty.

No. 809,361. PATENTED JAN. 9, 1906.
W. W. DOUGLASS.
WATER ELEVATING AND STORAGE APPARATUS.
APPLICATION FILED JUNE 9, 1904.
7 SHEETS—SHEET 6.
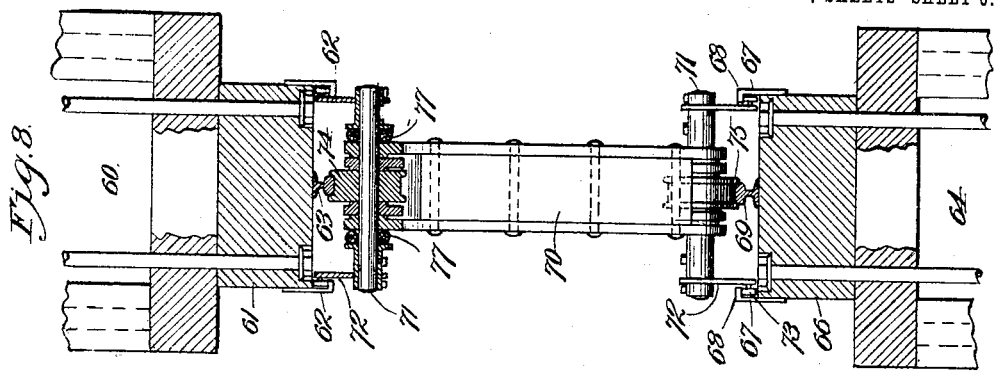
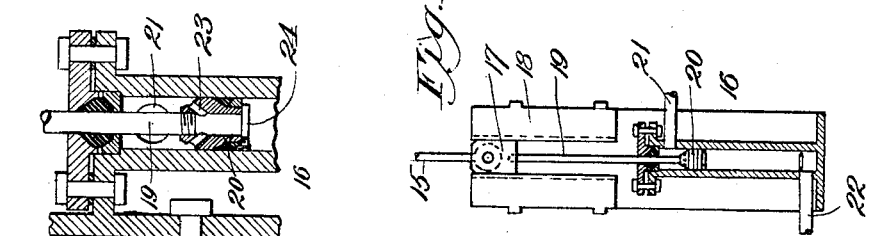
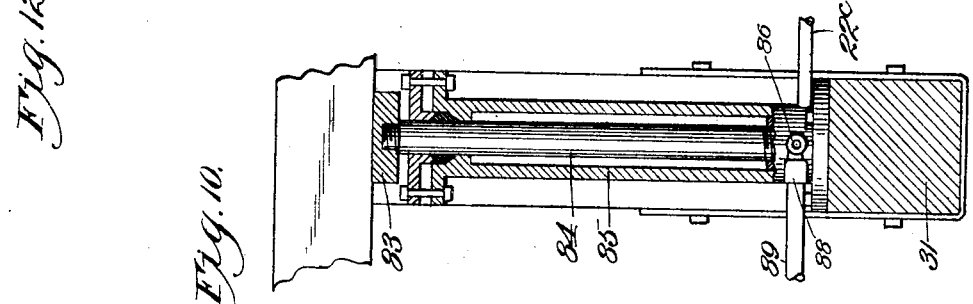
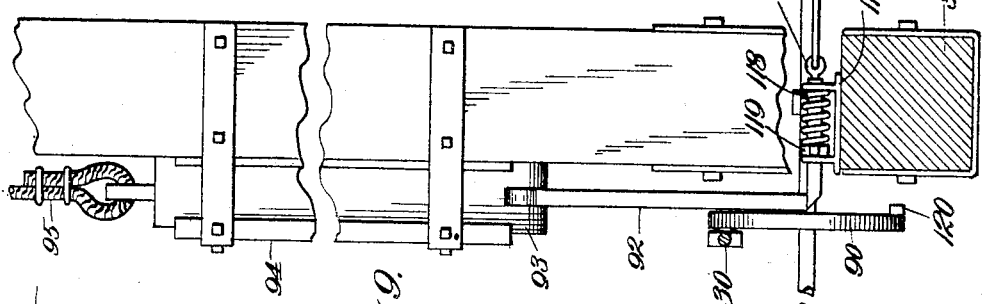
Witnesses:
A. McArthur
F. R. Glow
Inventor
W. W. Douglass
By George H. Thorpe
Atty.

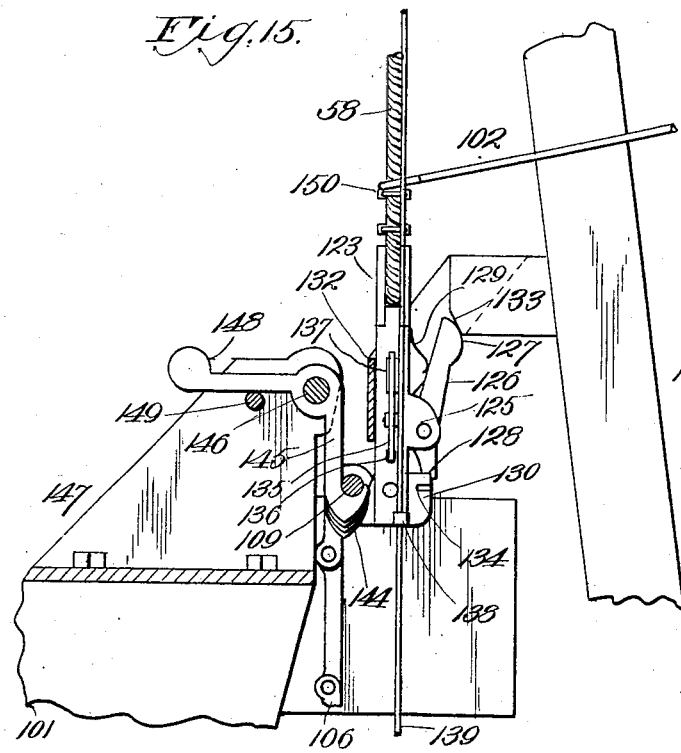

UNITED STATES PATENT OFFICE.

WILLIAM W. DOUGLASS, OF KANSAS CITY, MISSOURI.

WATER ELEVATING AND STORAGE APPARATUS.

No. 809,361.   Specification of Letters Patent.   Patented Jan. 9, 1906.

Application filed June 9, 1904. Serial No. 211,856.

*To all whom it may concern:*

Be it known that I, WILLIAM W. DOUGLASS, a citizen of the United States, residing at Kansas City, in the county of Jackson and State of Missouri, have invented certain new and useful Improvements in Water Elevating and Storage Apparatus, of which the following is a specification.

My invention relates to water elevating and storage apparatus; and my object is to produce an efficient and reliable apparatus of this character, whereby water can be elevated to and stored at a great height by the travel of an ox or other heavy animal on a revoluble platform.

With this general object in view and others of a tributary character, as hereinafter appear, the invention consists in certain novel and peculiar features of construction and combinations of parts, as hereinafter described and claimed, and in order that it may be fully understood reference is to be had to the accompanying drawings, in which—

Figure 1:
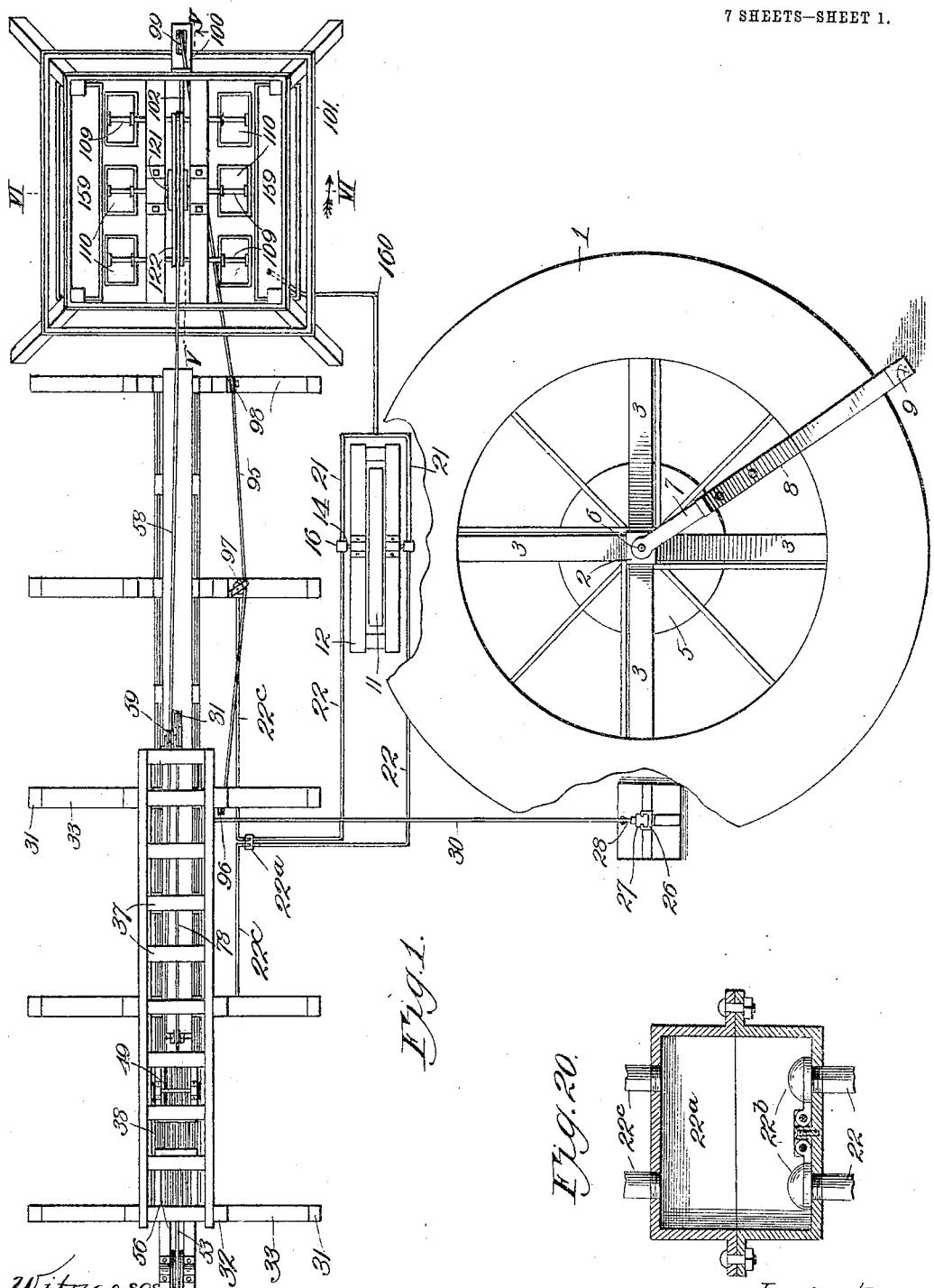
Figure 2:
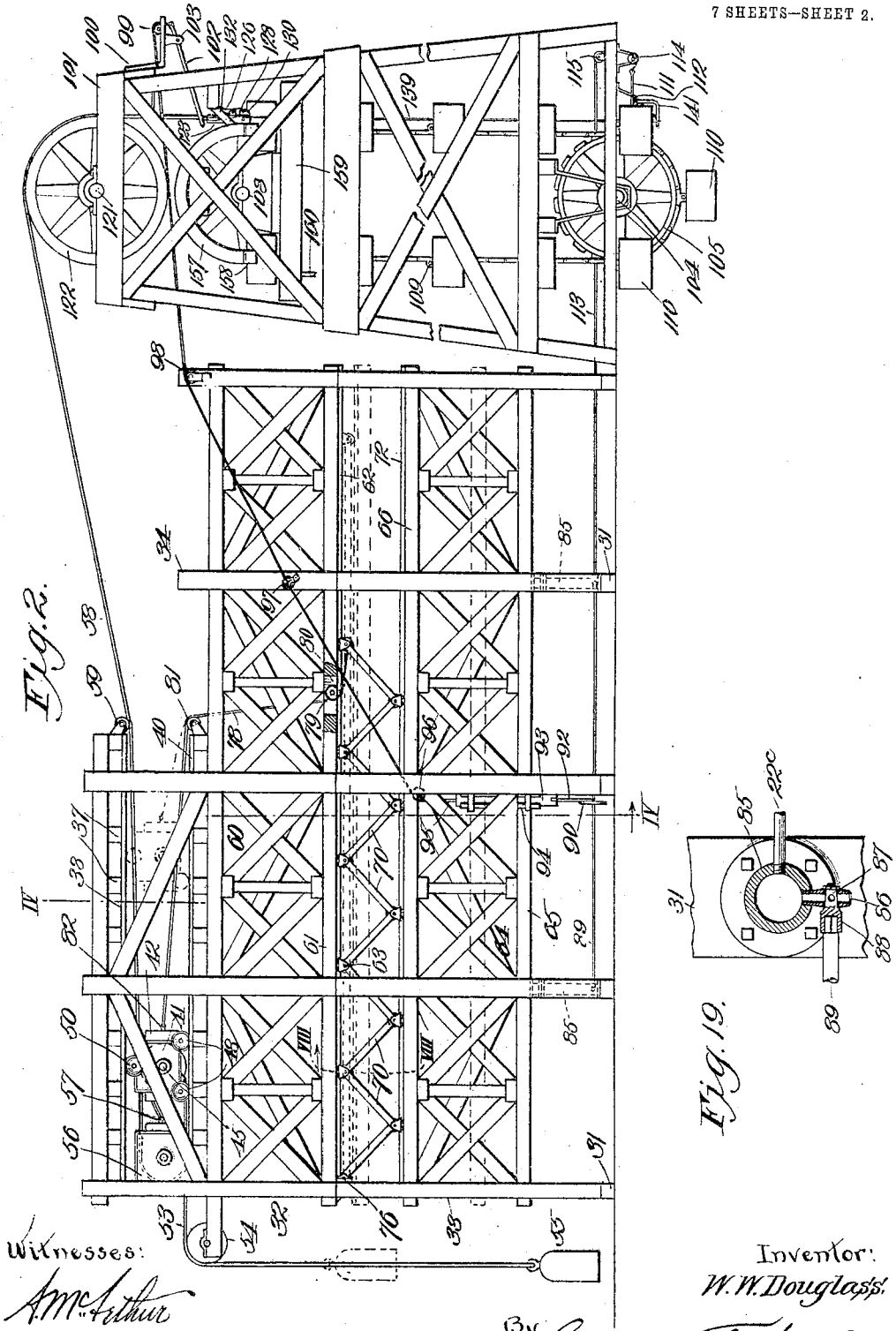
Figures 4, 5:
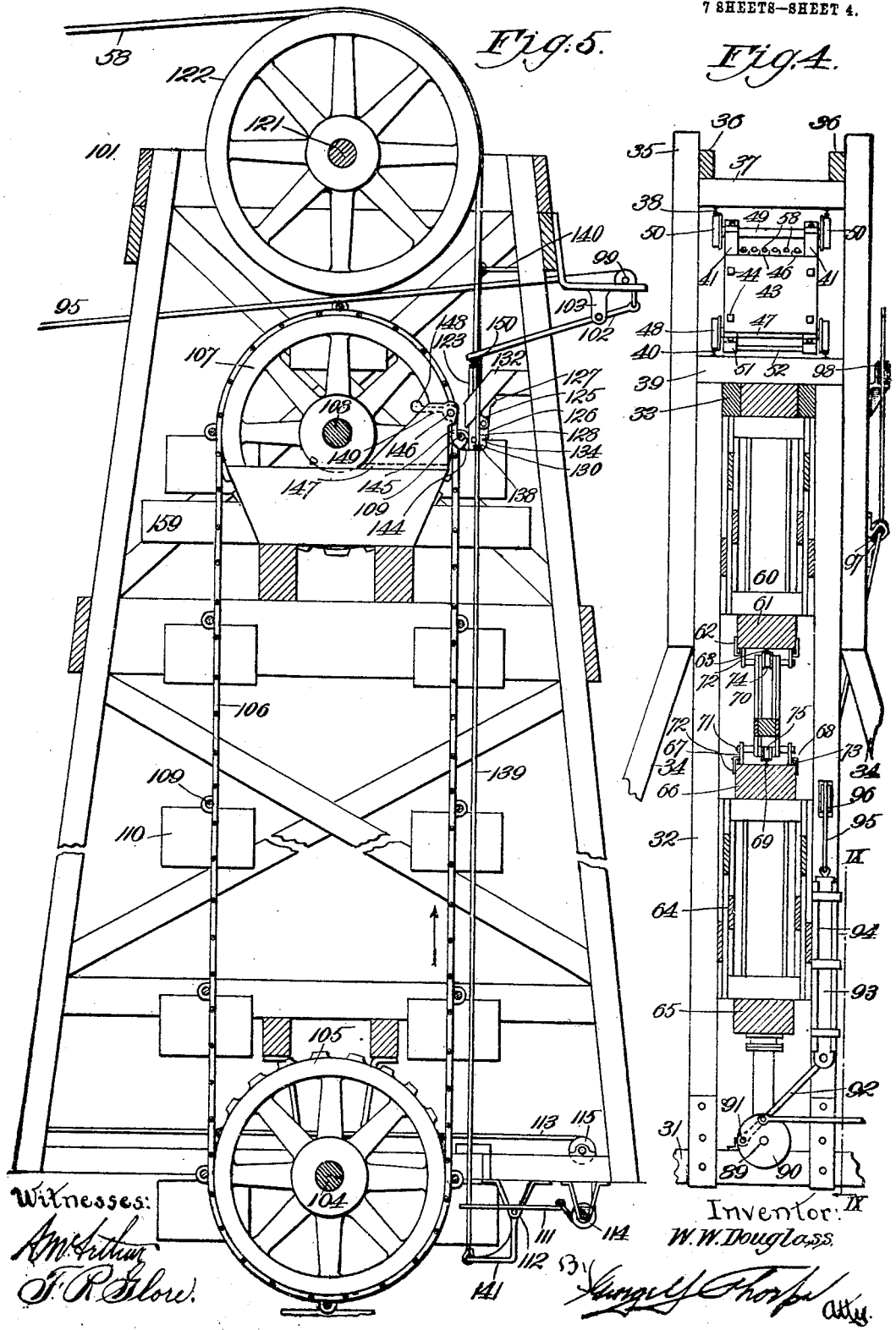

Figure 1 represents a top plan view of an apparatus embodying my invention. Fig. 2 is an enlarged side elevation of part of the apparatus. Fig. 3 is an end view of the apparatus on the scale of Fig. 1. Fig. 4 is a vertical section taken on the line IV IV of Fig. 2, but with the traveling drum advanced. Fig. 5 is a section taken on the line V V of Fig. 1, but on a larger scale. Fig. 6 is a section taken on the line VI VI of Fig. 1 on the same scale as Fig. 5. Fig. 7 is a detail sectional view showing one of the water-elevating buckets on a larger scale than Fig. 6. Fig. 8 is an enlarged section taken on the line VIII VIII of Fig. 2. Fig. 9 is an enlarged section taken on the line IX IX of Fig. 4. Fig. 10 is a section on the same scale as Fig. 9 of one of the hydraulic rams forming a part of the apparatus. Fig. 11 is a vertical section of one of the force-pumps forming a part of the apparatus. Fig. 12 is an enlarged section of a part of said pump, said figure also showing the piston in section. Fig. 13 is a view, partly in end elevation and partly in vertical section, of a multiple-groove stationary drum, said figure also showing in section the tracks upon which said drum travels. Fig. 14 is a view of said drum, partly in side elevation and partly in section, and also shows in elevation said tracks. Fig. 15 is a section and Fig. 16 an elevation of mechanism forming a part of the apparatus and located within the top of the tower of the same. Figs. 17 and 18 are sectional and end views, respectively, of mechanism located at the base of said tower. Fig. 19 is a horizontal section of one of the rams of the apparatus, taken in the plane of the valve thereof. Fig. 20 is a vertical section of a box-valve forming a part of the apparatus.

In the said drawings, 1 designates a revolving platform, having a central post 2 suitably braced, as at 3, from the inner edge of the platform, said post being journaled in any suitable manner in a base 5 and, as at 6 or otherwise in a plate 7, secured to a brace 8, mounted upon a post 9, rising from the ground and suitably anchored, and secured to the lower side and concentrically of the platform is a circular friction-track 10, engaging the periphery of a friction-wheel 11, having its shaft journaled in a suitable framework 12, erected, preferably, in a trench 13, said shaft terminating in oppositely-projecting cranks 14, pivotally connected to the links 15 of a pair of force-pumps 16, carried by said framework 12. The links (see Fig. 11) are pivoted to slides 17, mounted in guides 18 of said framework, and the slides are secured to the stems 19 of pistons 20, operating in the cylinders of the pumps between supply-pipes 21 and discharge-pipes 22, the latter leading to the box-valves 22$^a$, equipped with weighted valves 22$^b$, which open under the water-pressure from the pumps, but close to prevent backflow from the box-valve to said pipes 22, and leading from said box-valve to hydraulic rams, hereinafter described, are pipes 22$^c$. Each piston is hollow and is provided with a series of perforations 23 at its upper end and with a hinged flap-valve 24, closing its lower end, said valve being adapted to open as the piston rises, so as to permit water entering the cylinder through pipe 21 to pass below the piston and to close as the piston descends, so as to force the water below it out through pipe 22.

To overcome the momentum of the revolving platform at the desired time, I provide a brake for engagement with friction-track 10, said brake comprising a braced standard 25, vertically below the track and provided with a vertical U-shaped guide 26, wherein is slidingly mounted with a tongue-and-groove relation the brake-shoe 27, connected by links 28 29 to the base of the standard, said links constituting a toggle, which is expanded or contracted by the rod 30, pivotally connected thereto and adapted to be operated by mechanism hereinafter described.

A stationary framework comprises a plurality of transverse sills 31, upon which are erected vertical posts 32, connected at or near their upper ends and inner sides by parallel horizontal bars 33, and said posts are braced by inclined braces 34, and rising from the outer sides of a number of said posts and braces to a higher plane than the frame are extension-posts 35, connected at their inner sides by horizontal parallel bars 36, equipped with cross-ties 37 at their lower sides for the inverted track-rails 38, extending longitudinally of the machine. Similar cross-ties 39 are carried by longitudinal bars 33 and are equipped at their upper sides with longitudinal track-rails 40, in vertical alinement with track-rails 38. A traveling drum engaging said trackways is constructed as follows: 41 designates a pair of side plates connected at their front and rear sides by transverse blocks 42 and 43, respectively, said blocks being clamped against said plates by tie-bolts 44. 45 is a transverse shaft journaled at its ends in said side plates and equipped with six grooved pulleys 46, arranged side by side, so as to conjointly form a multiple-groove drum, these pulleys being of course rigid on the shaft. At the front and rear corners of the drum are journaled transverse shafts 47, carrying flanged wheels 48, engaging track-rails 40, and a shaft 49, journaled in the frame vertically above shaft 45, carries flanged wheels 50, engaging track-rails 38. Depending from the side plates 41 rearward of shaft 45 are lugs 51, connected by a cross-rod 52, to which is secured the front end of a cable 53, said cable leading back over a guide-pulley 54, supported from the stationary framework and having a weight 55 attached to its lower end, said weight being adapted to move the traveling drum from the position shown in dotted to the position shown in full lines, Fig. 2, for a purpose which hereinafter appears.

Secured rigidly in the framework contiguous to guide-pulley 54 is a multiple-groove drum 56, which is preferably a duplicate of the traveling drum, with the exception of the track-wheels of the latter, and said stationary drum is provided with an eyebolt 57 at its side contiguous to the traveling drum, and secured to said eyebolt is one end of a cable 58, which cable extends upwardly over one of the end grooved wheels 46, around the same to its under side, thence straight back to the corresponding grooved wheel of the stationary drum, up around the latter, and from its upper side to the upper side of the second wheel 46 of the traveling drum, this arrangement being continued until there are six loops in the cable connecting said drums. From the end wheel of the stationary drum opposite to that first engaged by the cable the latter extends over and out of contact with the traveling drum and engages the guide-pulley 59 of the framework, and from the latter leads to a wheel, hereinafter described.

Below the stationary and traveling drums the framework is equipped with a truss-frame 60, embodying a central longitudinally-extending bar 61, and depending from the same are marginal angle-tracks 62 and a central track 63. A vertically-movable truss-frame 64 is located within the framework and below the truss-frame 60 and embodies a central longitudinally-extending bar 65 at its lower side and a similar bar 66 at its upper side, the last-named bar being provided with upwardly-projecting marginal angle-tracks 68 and a central track 69.

A lazy-tongs frame adapted to expand longitudinally toward the end of the framework contiguous to the weight comprises a series of links 70, pivotally mounted on shafts 71, the shafts being journaled in brackets 72, provided with a pair of rollers 73, the rollers of the upwardly-projecting brackets engaging the angle-tracks 62, and the rollers of the depending brackets, the angle-tracks 67. Said shafts are also equipped with grooved rollers 74, engaging track-rails 63, and 75 engaging track-rails 69. The link 70 nearest weight 55 is pivotally connected, as at 76, to the framework, and the link at the opposite extremity of the lazy-tongs is connected to the branched ends 77 of the cable 78, which extends around a pulley 79, journaled in a slot 80 of bar 61, and around a guide-pulley 81 to the eyebolt 82, projecting from the traveling drum.

The vertically-movable truss-frame is secured rigidly upon the heads 83 of the piston-stems 84 of a pair of hydraulic rams 85, mounted on sills 31 of the framework, and the lower ends of said rams are connected to the pipes 22, leading from the force-pumps, hereinbefore described. Each ram is also provided at its lower end with an outwardly-projecting tubular plug 86, (see Fig. 19,) containing a rotary plug-valve 87, equipped with an angular socket 88, receiving one of the squared ends of a horizontal shaft 89, extending longitudinally of the framework, the connection being such that rotary movement of the shaft shall simultaneously open or close said valves. At an intermediate point a disk 90 is rigidly mounted on the shaft, said disk having a wrist-pin 91, pivotally connected by a link 92 with a vertically-slidable weight 93, mounted in guides 94 on the contiguous post 32 of the framework, hereinafter described. A cable 95 extends up from the weight over guide-pulleys 96, 97, and 98, carried by the framework, and over pulley 99, carried by a bracket 100, of a tower 101, the cable extending down from said pulley 99 to a lever 102, fulcrumed in a bearing 103, depending from said bracket.

The tower 101 of full size will be approximately one hundred and twenty feet high and disposed over a water-supply, so that the water may be raised a distance of about one hundred and twenty feet, as hereinafter more particularly referred to.

The tower may be of the skeleton type shown or of any other suitable or preferred type, and journaled therein a short distance above the water-line is a shaft 104, extending transversely of the truss-carrying framework and equipped with a pair of sprocket-wheels 105, connected by endless sprocket-chains 106 with a similar pair of wheels 107, secured on a similar shaft 108, journaled in the upper part of the tower, and connecting said chains at suitable intervals are horizontal rods 109, from which buckets 110 are pivotally suspended, the buckets being suspended from the ends of the rods outward of the chains.

111 designates a lever fulcrumed for vertical movement on a bracket 112, depending from the base of the tower in the vertical plane of the truss-carrying framework, one end of the lever projecting almost into the vertical plane of the ascending side of the chains. Its opposite end is connected to a cable 113, which extends down around a suitably-supported guide-pulley 114, thence upward and over a guide-pulley 115, thence horizontally and longitudinally of the truss-carrying framework to the beveled end bolt 116, mounted to slide longitudinally in bracket 117, carried by a sill of said framework, a spring 118, upon the bolt and bearing at its opposite ends against the bracket and the collar 119 on the bolt, serving to hold its beveled end in the path of a tooth 120 of disk 90, so that when said disk makes a quarter of a revolution its tooth shall force the bolt back, the latter springing forward to its original position immediately the tooth passes, so as to underlie the latter and prevent its opposite rotation until the bolt is withdrawn through the instrumentality of said lever 111, as hereinafter explained, and in this connection it should be stated that rod 30, connected to the brake, is pivotally connected at its opposite end to the disk 90, so that with each rotatable movement of the disk in a certain direction said brake shall be forced into engagement with the friction-track 10.

Journaled in the upper end of the tower is a shaft 121, carrying a grooved pulley 122, over which the multiple-looped cable 58 extends from the stationary drum, the opposite end of the cable being attached to the upper end of a clutch 123. Said clutch is preferably bifurcated or slotted, as at 124, and provided at opposite sides of the bifurcation with lugs 125, between which in the plane of the bifurcation is pivoted a lever 126, having a rounded upper end 127 and a stepped lower end 128, and a spring 129, secured to the clutch tends to hold the lever in the position shown in Fig. 15, with its stepped end engaging one of the upper corners of a hook 130, pivoted, as at 131, in the bifurcation or slot 124, said hook when engaged by the lever being adapted when moved upward to engage the proximate cross-rod of the conveyer or elevator composed of the chains and buckets, as will be readily understood by reference to Figs. 15 and 17.

At the proper time in the upward movement imparted to the clutch by cable 58, as hereinafter explained, the clutch enters the rigid frame 132, carried by the tower, and the head 127 of the lever 126 engages the rigid cam 133, said cam forcing the engaged end of lever toward the body of the clutch, so as to release the hook 130 and permit it to be swung to a vertical position, as in Fig. 17, and thus release the conveyer-rod, the hook being automatically relocked in its vertical position by the engagement with its notch 134 of a locking-lever 135, said lever normally projecting into the path of the hook through opening 136 under the pressure of spring 137, carried by the clutch, as shown in Fig. 16. To guide the clutch in its vertical movement, it is provided at its opposite sides with apertured lugs 138, slidingly engaging ropes or cables 139, secured at their upper ends to an arm 140 of the tower and at their lower ends to an arm 141 of the bracket, on which lever 111 is pivoted, as shown in Fig. 5.

Suitably supported at the bottom of the tower vertically below frame 132 is a frame 142, to receive the clutch when in its depressed position, as shown in Figs. 17 and 18. As the clutch passes through said frame one of the side arms of the latter engages and operates lever 135 and against the resistance of spring 137 withdraws its lower end from notch 134, so as to permit the hook 130 to swing by gravity in the direction indicated by the arrow, Fig. 17, to the position shown in Fig. 15, below the proximate cross-rod of the conveyer, it being also noticed that as said hook was released the cam 143, carried by said frame 142, was engaged by the head 127 of lever 126 and forced the stepped lower end of said lever out of the path of the hook, so as to permit the latter to assume the horizontal position referred to, in which position it is locked by the lever 126 as soon as the latter's head 127 moves upward a sufficient distance to clear cam 143, as will be readily understood by reference to Fig. 17. Just before the clutch attains the position shown in Fig. 15 the engaged cross-rod of the conveyer successively strikes the beveled edges 144 of a series of catches 145, pivotally mounted on a rod 146, carried by a stationary frame 147 of the tower, said catches having weighted arms 148 to hold them yieldingly in the path of the conveyer cross-rods, a cross-pin 149 being carried by frame 147 to limit the pivotal movement of said catches. As the conveyer cross-rod engaged by the hook 130 clears the hook end of said catches the latter swing back under it, and at the same time the head of lever 126 is engaged and operated by cam 133 to effect the release of hook 130, so that as the upward movement of the clutch continues the resistance offered by said conveyer-rod will cause it to rest upon the series of catches and offer a resistance which swings the hook 130 to the position shown in Fig. 17, where it is automatically locked in such position by the spring-actuated lever 135. During this movement of the hook the collar 150 of cable 58 is operating lever 102 and through the instrumentality of cable 95 elevating the sliding weight 93 and imparting movement to disk 90, as hereinafter more particularly referred to. As the said conveyer-rod is released from the hook 130 the conveyer tends to rotate backward, because all of the ascending buckets are charged with water, and in order to reduce the shock or jar incident to this change of support I arrange the catches obliquely, as shown, this arrangement resulting in the imposition of the weight on two of the catches, which pivotally yield to permit the load to rest also upon a second pair of catches, said catches also yielding to distribute part of the strain on a third pair, and the latter yielding for the same purpose that a fourth pair may also bear a part of the burden. By this successive interposition of resistance to downward movement the shock is cushioned, as will be readily understood.

It will be seen from the foregoing that the upward movement of the conveyer is intermittent and that it moves so only when the clutch is traveling upward, and it will be also understood that as the clutch makes a movement of substantially one hundred and twenty feet each of said movements results in raising and emptying nearly one-half of the total number of conveyer-buckets—that is to say, all of the filled buckets in advance of the one whose cross-rod is engaged by the clutch are emptied.

Referring now more particularly to the bucket mechanism, it will be seen that the buckets are pivotally suspended by arms 151 from conveyer cross-rods and have openings 152 in their bottoms, which discharge into outwardly-projecting spouts 153. The openings are controlled by hinge-valves 154, equipped with angle-arms 155, which project over and beyond the outer side walls of the buckets and are provided with track-rollers 156.

157 designates a pair of semicircular arch-tracks suitably supported from the tower at the outer sides of the buckets and terminating at their ends in downwardly-diverging cam portions 158, interposed in the path of the rollers 156 of all of the buckets charged with water, so that said rollers as they successively come in contact with said cam portions shall be forced back, as indicated by the arrow in Fig. 7, and the valves raised, the water escaping through the openings in the spouts, from which it is discharged into the storage-tanks 159, suitably supported in the tower in a plane below that which the buckets successively occupy when their valves are opened, and connected to one of said tanks is pipe 160, coupled at its opposite end to force-pump supply-pipes 21, as shown in Fig. 1.

Before proceeding with the detailed description of the entire operation of the apparatus, it should be stated that the rams are adapted to raise the movable frame eighteen inches, that the elevation of said frame increases the length of the lazy-tongs frame ten feet, and consequently moves the traveling drum the same distance, such movement of said drum, because of the multiple-loop connection with the stationary drum, raising the clutch a distance of one hundred and twenty feet, the clutch in turn imparting a one-hundred-and-twenty-foot movement to the conveyer. The parts are so proportioned that a single ox walking on the revolving platform or tread-mill for two and one-half minutes is instrumental in raising one ton of water one hundred and twenty feet high, where it has a force of thirty tons hydraulic.

The general operation is as follows: The ox walking upon the revolving platform rotates the same and through the instrumentality of the gearing described operates the force-pumps and pumps water from one of the tanks 159, through pipes 160, 21, and 22, box-valves 22$^a$, and pipes 22$^c$ to the hydraulic rams and forces the pistons thereof upward to raise the movable truss-frame and effect the expansion of the lazy-tongs frame, said frame operating with a minimum of friction, because its rollers travel upon tracks 62, 63, 68, and 69. The expansion of the lazy-tongs frame through the medium of cable 78 draws the traveling drum from the position shown in full to the position shown in dotted lines, Fig. 2, which action elevates weight 55 and lengthens the multiple loop between said drum and the stationary drum, and therefore raises the clutch a distance equal to that between the shafts 104 and 108 of the endless conveyer, and the connection hereinbefore described between the clutch and one of the cross-rods of the conveyer imparts movement to the latter and discharges approximately one ton of water into the tanks 159, the tanks receiving the water from the proximate series of buckets, as will be readily understood by reference to Figs. 1 and 4, all of this being accomplished within a two and one-half minute travel of the ox. As such travel is about completed the clutch, as hereinbefore explained, operates lever 102 and raises through the instrumentality of cable 95 the weight 93, which movement of the weight results in turning disk 90 a quarter of a revolution and locking it against back movement by the engagement of its tooth 120 with the spring-actuated bolt 116, as hereinbefore explained. Said rotary movement of the disk at the same time sets the brake against the traveling platform to arrest momentum of the same through the medium of rod or pitman 30 and the toggle, composed of links 28 and 29, (see Fig. 3,) and likewise through the rotation of shaft 89 opens the valves of the hydraulic rams to permit the water therein to escape, backflow in pipes 22ᶜ being prevented by the box-valve, as will be readily understood. At the instant said valves open the movable truss-frame begins to descend, and because of its flanged track connection with the lazy-tongs frame contracts the latter, and therefore relieves the tension of cable 78 and permits the weight 55 to likewise gravitate and draw the traveling drum back toward the stationary drum. This action results in the contraction of the multiple-loop connection between said drums, and therefore in the descent of the clutch to its original position. As the various parts attain their original positions said clutch strikes and operates lever 111 and causes cable 113, connected thereto, to withdraw the spring-actuated bolt 116 from the path of the disk-tooth, which action is followed by the gravitative action of the slidable weight 93 and the consequent back rotation of the disk to its original position and the reclosure of the valves of the rams, and through the medium of the rod or pitman 30 the release of the brake. The ox is again started to effect a repetition of the operations described.

From the above description it will be apparent that I have produced a water elevating and storage apparatus embodying the features of advantage enumerated as desirable in the statement of invention, and while I have illustrated and described the preferred embodiment of the same, it is obvious that it is susceptible of various changes in its form, proportion, detail construction, and arrangement of the parts without departing from the principle of construction involved or sacrificing any of its advantages.

Having thus described the invention, what I claim as new, and desire to secure by Letters Patent, is—

1. In an apparatus of the character described, the combination of a water-elevating mechanism, a cable to effect the operation of said mechanism, a suitable framework, a stationary drum therein to which is rigidly secured said cable, and a drum movable toward and from the stationary drum and engaged by a loop in said cable.

2. In an apparatus of the character described, the combination of a water-elevating mechanism, a cable to effect the operation of said mechanism, a suitable framework, a stationary drum therein to which is rigidly secured said cable, a drum movable toward and from the stationary drum and engaged by a loop in said cable, and means for effecting the travel of said movable drum from the stationary drum.

3. In an apparatus of the character described, the combination of a water-elevating mechanism, a cable to effect the operation of said mechanism, a suitable framework, a stationary drum therein to which is rigidly secured said cable, a drum movable toward and from the stationary drum and engaged by a loop in said cable, means for effecting the travel of said movable drum from the stationary drum, and means for moving the movable drum toward the stationary drum.

4. In an apparatus of the character described, the combination of a water-elevating mechanism, a cable to effect the operation of said mechanism, a suitable framework, a stationary drum therein to which is rigidly secured said cable, a drum movable toward and from the stationary drum and engaged by a loop in said cable, and an expansive frame connected to the movable drum and adapted when expanding to move said drum away from the stationary drum.

5. In an apparatus of the character described, the combination of a water-elevating mechanism, a cable to effect the operation of said mechanism, a suitable framework, a stationary drum to which is rigidly secured said cable, a drum movable toward and from the stationary drum and engaged by a loop in said cable, an expansive frame connected to the movable drum and adapted when expanding to move said drum away from the stationary drum, and means for yieldingly impelling the movable drum toward the stationary drum after the expansion of said frame has occurred.

6. In an apparatus of the character described, the combination of a water-elevating mechanism, a cable to effect the operation of said mechanism, a suitable framework, a stationary drum to which is rigidly secured said cable, a drum movable toward and from the stationary drum and engaged by a loop in said cable, an expansive frame having one end fixed and the other movable, and a suitably-guided cable connected to the movable end of the expansive frame and to said movable drum.

7. In an apparatus of the character described, the combination of a water-elevating mechanism, a cable to effect the operation of said mechanism, a suitable framework, a stationary drum to which is rigidly secured said cable, a drum movable toward and from the stationary drum and engaged by a loop in said cable, an expansive frame having one end fixed and the other movable, a suitably-guided cable connected to the movable end of the expansive frame and to said movable drum, one or more hydraulic jacks for effecting the expansion of said frame, and means for discharging the water from said jack or jacks to permit said frame to contract.

8. In an apparatus of the character described, the combination of a water-elevating mechanism, a framework, a stationary frame therein, a vertically-movable frame therein, a lazy-tongs frame secured at one end to the framework, and arranged between the superposed movable and stationary frames, a stationary drum in said framework, a drum to travel toward and from said stationary drum, a cable secured at one end to the stationary drum and looped around the same and the movable drum and extending from the stationary drum and connected at its opposite end to the water-elevating mechanism to operate the same, means for drawing the movable drum yieldingly toward the stationary drum, a suitably-guided cable connecting the movable drum and the free end of the lazy-tongs frame, one or more valve-controlled hydraulic rams supporting the movable frame, a force-pump having a check-valve-controlled pipe connection with said ram or rams, a vertically-slidable weight on the framework, a disk connected to open and close the valve of each ram, a link connecting the disk and slidable weight, a spring-actuated bolt to lock the disk against back rotation when the weight is raised, means operated by the water-elevating mechanism to raise said weight and open the ram-valve when the vertically-movable frame is elevated, and means also actuated by the operation of the water-elevating mechanism for unlocking the bolt from said disk to permit the weight to descend.

In testimony whereof I affix my signature in the presence of two witnesses.

WILLIAM W. DOUGLASS.

Witnesses:
GEO. S. SAYLOR,
MARGARET SMITH.